US008444918B2

(12) United States Patent
Tanaka

(10) Patent No.: US 8,444,918 B2
(45) Date of Patent: May 21, 2013

(54) WATER PURIFIER

(75) Inventor: Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 107 days.

(21) Appl. No.: 13/145,599

(22) PCT Filed: Feb. 19, 2010

(86) PCT No.: PCT/JP2010/052516
§ 371 (c)(1),
(2), (4) Date: Jul. 21, 2011

(87) PCT Pub. No.: WO2010/095707
PCT Pub. Date: Aug. 26, 2010

(65) Prior Publication Data
US 2011/0278467 A1    Nov. 17, 2011

(30) Foreign Application Priority Data

Feb. 23, 2009  (JP) .................... 2009-039822
Feb. 23, 2009  (JP) .................... 2009-039824

(51) Int. Cl.
*C02F 1/32*    (2006.01)
*A61L 2/10*    (2006.01)
*G01N 21/33*   (2006.01)

(52) U.S. Cl.
USPC .......... 422/24; 422/186.3; 250/372; 250/435; 250/455.11; 250/461.1; 250/504 R; 210/748.1; 210/85

(58) Field of Classification Search
USPC ............ 422/24, 186.3; 250/372, 435, 455.11, 250/504 R, 461.1; 210/748.1, 85
See application file for complete search history.

(56) References Cited

U.S. PATENT DOCUMENTS

| 4,255,383 | A  | * | 3/1981 | Schenck .......................... 422/24 |
| 6,723,232 | B2 | * | 4/2004 | Simon .............................. 210/87 |
| 7,338,595 | B2 | * | 3/2008 | VanNewenhizen et al. . 210/96.2 |
| 8,252,171 | B2 | * | 8/2012 | Doran .............................. 210/87 |

FOREIGN PATENT DOCUMENTS

| JP | 10-076258   | 3/1998  |
| JP | 10-151449   | 6/1998  |
| JP | 10-192893   | 7/1998  |
| JP | 2001-000963 | 1/2001  |
| JP | 2001-246368 | 9/2001  |
| JP | 2004-128331 | 4/2004  |
| JP | 2004-174412 | 6/2004  |
| JP | 2005-124797 | 5/2005  |
| JP | 2008-296103 | 12/2008 |
| WO | 0071227     | 11/2000 |

* cited by examiner

*Primary Examiner* — Nikita Wells
(74) *Attorney, Agent, or Firm* — Fish & Richardson P.C.

(57) ABSTRACT

The disclosed water purifier comprises an outer wall, a RAW water inflow section that allows inflow of RAW water from outside said outer wall, a purifying section, an ultraviolet ray sterilizing section that has an ultraviolet ray source, a purified water outflow section that allows purified water that has been purified in said purifying section and sterilized in said ultraviolet ray sterilizing section to flow to the outside of said outer wall, a condition-detecting unit, and a control unit that controls generation of ultraviolet rays from said ultraviolet ray source according to the detection by said condition-detecting unit.

19 Claims, 6 Drawing Sheets

WATER PURIFIER

TECHNICAL FIELD

The present invention relates to a water purifier, and more particularly to a water purifier provided with a sterilizing ability.

BACKGROUND ART

In recent years, there has been a raised interest in the quality of drinking and other water, and water purifiers have widely spread in households. To secure clean water, sterilization is as important as filtering, and accordingly there have been proposed water purifiers that incorporate a germicidal lamp.

LIST OF CITATIONS

Patent Literature

Patent Document 1: JP-A-H10-192893

SUMMARY OF INVENTION

Technical Problem

However, for water purifiers provided with a sterilizing ability to be realized in a form fit for general use as for use in households, there are many problems yet to be solved.

In view of the foregoing, an object of the present invention is to provide a water purifier that is provided with a sterilizing ability but is nevertheless fit for general use as for use in households.

Solution to Problem

To achieve the above object, according to the invention, a water purifier includes: an enclosure; a source water inlet through which source water is fed in from outside the enclosure; a purification section; an ultraviolet radiation sterilization section which has an ultraviolet light source; a purified water outlet through which purified water purified by the purification section and sterilized by the ultraviolet radiation sterilization section is fed out to outside the enclosure; a condition detection section; and a control section which controls generation of ultraviolet radiation from the ultraviolet light source according to the detection by the condition detection section (a first configuration).

In the water purifier of the first configuration described above, preferably, the condition detection section has an abnormality detection section which detects a condition in which ultraviolet radiation can leak from inside to outside the enclosure, and when the abnormality detection section detects the condition in which ultraviolet radiation can leak, the control section inhibits the ultraviolet light source from generating ultraviolet radiation (a second configuration).

In the water purifier of the second configuration described above, preferably, the enclosure has a lid for maintenance inside the water purifier, and the abnormality detection section detects whether or not the lid is in an improperly closed state (a third configuration).

In the water purifier of the second configuration described above, preferably, the abnormality detection section has a light leakage detection section which detects leakage of light from outside to inside the enclosure (a fourth configuration).

In the water purifier of the first configuration described above, preferably, the ultraviolet radiation sterilization section has a far-ultraviolet LED for letting ultraviolet radiation be transmitted through a quartz glass water passage (a fifth configuration).

In the water purifier of the fifth configuration described above, preferably, there is further provided a water passage transmitted radiation detection section which detects a flaw in transmission of far-ultraviolet radiation through the quartz glass water passage (a sixth configuration).

In the water purifier of the first configuration described above, preferably, the condition detection section has a running water detection section which detects a purified water outflow state in which purified water is flowing out through the purified water outlet; when the running water detection section detects the purified water outflow state, the control section makes the ultraviolet light source generate ultraviolet radiation, and when the running water detection section does not detect the purified water outflow state, the control section inhibits the ultraviolet light source from generating ultraviolet radiation (a seventh configuration).

In the water purifier of the first configuration described above, preferably, there is further provided a reservoir section in which purified water purified by the purification section is stored, the purified water outlet is configured to feed out the purified water stored in the reservoir section to outside the enclosure, and the ultraviolet radiation sterilization section has a far-ultraviolet LED and sterilizes the purified water before the purified water flows out through the purified water outlet (an eighth configuration).

In the water purifier of the eighth configuration described above, preferably, the far-ultraviolet LED is provided inside the reservoir section (a ninth configuration).

In the water purifier of the eighth configuration described above, preferably, the condition detection section has a stored water amount detection section which detects the amount of water stored in the reservoir section, and the control section controls the far-ultraviolet LED according to the detection by the stored water amount detection section (a tenth configuration).

In the water purifier of the eighth configuration described above, preferably, the control section inhibits the far-ultraviolet LED from generating ultraviolet radiation when the purified water in the reservoir section is discharged (an eleventh configuration).

In the water purifier of the first configuration described above, preferably, there is further provided a fluorescence derivation section which makes the ultraviolet radiation generated by the ultraviolet light source visible from outside the enclosure in a form of visible fluorescence having ultraviolet radiation eliminated therefrom (a twelfth configuration).

In the water purifier of the first configuration described above, preferably, the ultraviolet light source has a far-ultraviolet LED, and has a cooling section which cools down the far-ultraviolet LED with water inside the water purifier (a thirteenth configuration).

According to the invention, a water purifier includes: a water inlet; an ultraviolet radiation sterilization section which sterilizes water flowing in through the water inlet with a far-ultraviolet LED as a light source; a water outlet through which purified water sterilized by the ultraviolet radiation sterilization section is fed out, and a cooling section which cools down the far-ultraviolet LED with water flowing in through the water inlet (a fourteenth configuration).

In the water purifier of the fourteenth configuration described above, preferably, the cooling section cools down the far-ultraviolet LED with the very water flowing in through the water inlet and flowing out through the water outlet (fifteenth configuration).

In the water purifier of the fourteenth configuration described above, preferably, the cooling section has a water passage through which the water exposed to the ultraviolet radiation generated by the far-ultraviolet LED is passed to cool down the far-ultraviolet LED, the far-ultraviolet LED has an ultraviolet light emitting portion and a heat dissipating portion, and the water passage is arranged to run across the ultraviolet light emitting portion and the heat dissipating portion (a sixteenth configuration).

In the water purifier of the fourteenth configuration described above, preferably, there is further provided a drive section which drives the far-ultraviolet LED such that an ultraviolet radiation generation period and an ultraviolet radiation non-generation/cooling period alternate (a seventeenth configuration).

In the water purifier of the fourteenth configuration described above, preferably, there are further provided: a power supply section which is supplied with electric power from outside to drive the far-ultraviolet LED and which has a secondary battery charged with the supplied electric power; and a control section which normally supplies the far-ultraviolet LED with the electric power supplied from the outside and which, under a predetermined condition, even when electric power is being supplied from outside, supplies the far-ultraviolet LED with electric power from the secondary battery (an eighteenth configuration).

According to the invention, a water purifier includes: an ultraviolet radiation sterilization section which sterilizes water with a far-ultraviolet LED as a light source; a power supply section which is supplied with electric power from outside to drive the far-ultraviolet LED and which has a secondary battery charged with the supplied electric power; and a control section which normally supplies the far-ultraviolet LED with the electric power supplied from the outside and which, under a predetermined condition, even when electric power is being supplied from outside, supplies the far-ultraviolet LED with electric power from the secondary battery (a nineteenth configuration).

In the water purifier of the nineteenth configuration described above, preferably, there is further provided a water outlet through which water sterilized by the ultraviolet radiation sterilization section is fed out, and the control section supplies the far-ultraviolet LED with electric power from the secondary battery according to how water is flowing out through the water outlet (a twentieth configuration).

Advantageous Effects of the Invention

According to the present invention, it is possible to realize a water purifier that is provided with an ultraviolet radiation sterilizing ability but is nevertheless fit for general use as for use in households.

DESCRIPTION OF EMBODIMENTS

Figure 1:
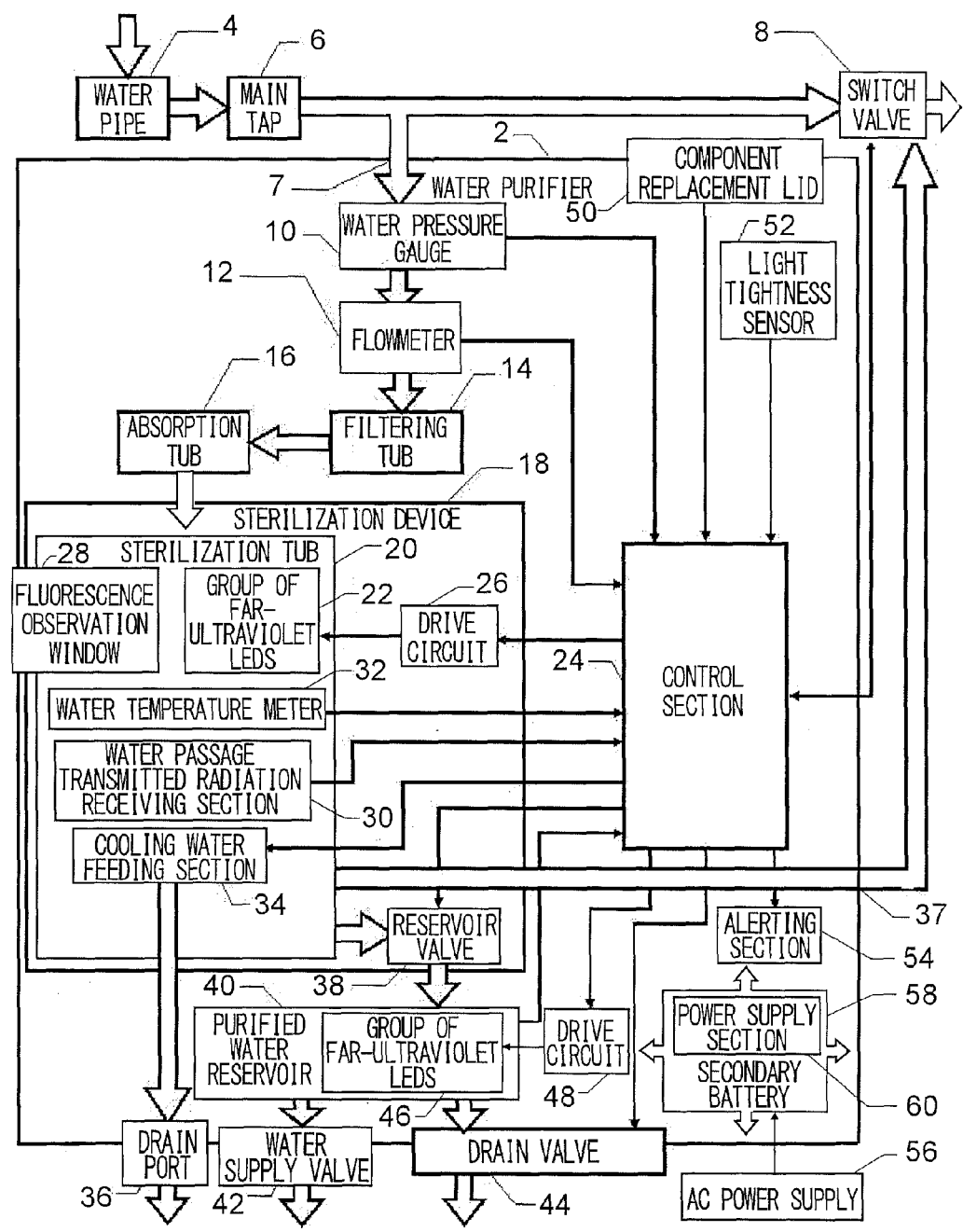
FIG. 1 is a block diagram of a practical example of a water purifier system according to one embodiment of the invention.

FIG. 1 is a block diagram of a practical example of a water purifier system according to one embodiment of the present invention. A water purifier 2 has a source water inlet 7 connected to a water pipe branching off a main tap 6 of a household water pipe 4 leading from outside. In FIG. 1, the reference sign 2 identifies the cabinet of the water purifier as well. Another water pipe branching off the main tap 6 is, as a bypass going around the water purifier 2, directly connected to a switch valve 8. The switch valve 8 is provided, for example, at a sink in a kitchen in a house, so that the served water can be switched between source water fed directly from the main tap 6 and purified water fed from the water purifier 2. In FIG. 1, the flow of water mentioned above is indicated by hollow arrows, and this applies in the following description. An operation to switch the switch valve 8 to serve water from the water purifier 2 can be made manually, and can also be made under the control of the water purifier 2. Here, whenever the switch valve 8 is operated manually, information on how it is operated is conveyed to the water purifier 2.

The source water fed into the water purifier 2 passes through a water pressure gauge 10 and a flowmeter 12, and enters a filtering tub 14. The filtering tub 14 filters out and removes comparatively large-sized impurities in water. The water that has passed through the filtering tub 14 then enters an absorption tub 16, where molecular-level impurities are removed by absorption. The water that has passed through the absorption tub 16 then enters a sterilization tub 20 in a sterilization device 18, where the water is treated to kill microbes.

In the sterilization tub 20, a group of far-ultraviolet LEDs 22 is provided, and the water passage in the sterilization tub 20 is so configured as to pass through the group of far-ultraviolet LEDs 22. The group of far-ultraviolet LEDs 22 can generate far-ultraviolet radiation in the UV-B or UV-C band. To permit far-ultraviolet radiation to be transmitted through it, the water passage through the group of far-ultraviolet LEDs 22 is formed of quartz glass. The group of far-ultraviolet LEDs 22 is driven by a drive circuit 26 controlled by a control section 24.

The driving by the drive circuit 26 relies on comparatively low-frequency pulse-width modulation control (hereinafter "PWM control"), and one purpose of this is, as will be discussed later, to vary the amount of energy of far-ultraviolet radiation according to the amount of water to be sterilized. Another purpose of PWM control is to achieve increased light emission efficiency by preventing the far-ultraviolet LEDs from overheating as a result of continuous lighting. That is, PWM control is used to achieve the following operation: after the far-ultraviolet LEDs are turned on, before their temperature becomes so high as to degrade light emission efficiency, the far-ultraviolet LEDs are turned off, and their cooling-down is waited for before the far-ultraviolet LEDs are turned on again.

Moreover, according to the invention, as will be discussed later, the far-ultraviolet LEDs are cooled down with the water that is fed into the water purifier, and thus providing the periods for cooling down by exploiting the off periods of PWM control exerts a remarkable effect. While mercury lamps and xenon lamps are common as light sources of ultraviolet radiation, in this embodiment, far-ultraviolet LEDs are adopted to realize a water purifier that offers a powerful sterilizing effect, is compact, and is fit for use in households. Far-ultraviolet radiation is hazardous to the human body, and therefore, as will be discussed later, in this embodiment various safety measures are adopted. The control section 24, which controls the drive circuit 26, is constituted by a computer, and its functions are performed by a program stored in a memory section and a computation circuit.

Part of the enclosure of the sterilization tub 20 is formed into a fluorescence observation window 28, which is formed of ordinary glass that does not transmit far-ultraviolet radiation itself but which is coated, on the inside, with a fluorescent substance that converts far-ultraviolet radiation to visible light. Through this fluorescence observation window 28, visible fluorescence can be seen, and this permits one to check the light emission of the far-ultraviolet LEDs visually from outside the water purifier 2. Moreover, the sterilization tub 20 is provided with a water passage transmitted radiation receiving section 30, which receives the light emitted from the group of far-ultraviolet LEDs 22 and transmitted through the quartz glass water passage inside the sterilization tub 20. The output of the water passage transmitted radiation receiving section 30 is conveyed to the control section 24, and this permits one to check the light emission of the group of far-ultraviolet LEDs 22 without relying on visual checking. The water passage transmitted radiation receiving section 30 achieves its detection by use of a photo sensor that is sensitive to far-ultraviolet radiation, or by detecting fluorescence resulting from conversion of far-ultraviolet radiation with a fluorescent substance by use of a photosensor sensitive to longer-wavelength radiation. The water passage transmitted radiation receiving section 30 is used not only to check the light emission of the group of far-ultraviolet LEDs 22 but also to check for dirt inside the quartz glass water passage and hence to detect a lowering in the sterilizing effect.

As the group of far-ultraviolet LEDs 22 generates heat, its light emission efficiency lowers, and in the embodiment of the invention, a configuration is adopted in which, with the very water that circulates in the sterilization tub 20, the group of far-ultraviolet LEDs 22 is water-cooled. A water temperature meter 32 monitors the temperature of the water circulating in the sterilization tub 20 to convey it to the control section 24. When the water temperature becomes equal to or higher than a predetermined temperature, the control section 24 instructs a cooling water feeding section 34 to increase the amount of water flowing from the absorption tub 16 into the sterilization tub 20 so that water is introduced into an additional water cooling passage, provided in a separate circuit, through the group of far-ultraviolet LEDs 22. The water passing through the additional water cooling passage is not sterilized for a sufficient length of time, and therefore it is not mixed with purified water but is discharged through a drain port 36.

The purified water sterilized in the sterilization tub 20 can be used as running water through the switch valve 8 connected to a purified water outlet 37, and can also be stored, with a reservoir valve 38 opened, in a purified water reservoir 40 so that it can be used when necessary with a water supply valve 42 opened, which is provided in a separate circuit. As compared with when purified water is supplied on a real-time basis through the switch valve 8, when it is stored in the purified water reservoir 40, it is possible to reduce the amount of water passed through the sterilization tub 20 and thus to reduce the energy intensity of the group of far-ultraviolet LEDs 22. For purified water that has been stored in the purified water reservoir 40 for a long time, safety cannot be guaranteed. Therefore, when the storage time exceeds a predetermined length of time, a drain valve 44 can be opened so that the water in the purified water reservoir 40 is discharged and replaced with fresh purified water from the sterilization tub 20. The reservoir valve 38 and the drain valve 44 are controlled automatically by the control section 24, which monitors the water level in the purified water reservoir 40 and its change with time. The purified water reservoir 40 too is provided with a group of far-ultraviolet LEDs 46 so as to further sterilize the stored purified water. The group of far-ultraviolet LEDs 46 is controlled by the control section 24. Although not shown, the purified water reservoir 40 too is provided with a fluorescence observation window and a transmitted radiation receiving section like those provided in the sterilization tub 20, so that it is possible to check the light emission of the group of far-ultraviolet LEDs 46 both visually and by the control section 24.

Maintenance work such as component replacement, cleaning, etc. with respect to the filtering tub 14, the absorption tub 16, the sterilization tub 20, and the purified water reservoir 40 are done with a component replacement lid 50 opened. Since there is then a risk of exposure to far-ultraviolet radiation, the control section 24 monitors whether the component replacement lid 50 is in an open or closed state, and if it is in an open state, inhibits the group of far-ultraviolet LEDs 22 and the group of far-ultraviolet LEDs 46 from being lit. Here, an "open state" encompasses not only a clearly open state but any state posing a risk of leakage of ultraviolet radiation, for example an improperly closed state. Furthermore, whether or not, due to the component replacement lid 50 being incompletely closed or due to the enclosure of the water purifier 2 being broken somewhere, light is leaking from outside to inside is checked with a light tightness sensor 52; if leakage of light from outside to inside is detected, there is a risk of ultraviolet radiation leaking from inside to outside, and accordingly the control section 24 inhibits the group of far-ultraviolet LEDs 22 and the group of far-ultraviolet LEDs 46 from being lit.

The control section 24 inhibits the group of far-ultraviolet LEDs 22 from being lit also when the water purifier 2 is not in use and thus no water pressure is present at the water pressure gauge 10 or the flowmeter 12 does not detect a predetermined flow rate. Furthermore, the control section 24 inhibits the group of far-ultraviolet LEDs 46 from being lit when the purified water reservoir 40 is empty. In this way, unforeseeable accidents that may result from exposure to far-ultraviolet radiation are prevented. When an abnormal situation arises in which the group of far-ultraviolet LEDs 22 or the group of far-ultraviolet LEDs 46 should be inhibited from being lit as mentioned above, an alerting section 54 gives out an alert to outside the water purifier in the form of a light signal or a sound signal such as an alert sound or an announcement.

The different parts of the water purifier 2 described above are supplied with electric power from a power supply section 58 which is connected to a receptacle of AC power supply 56. The power supply section 58 is provided with a secondary battery 60, which is kept fully charged by trickle charge in preparation for water purification and sterilization at the time of a power outage or the like. Every time the switch valve 8 has been opened and closed a predetermined number of times, even when the supply of electric power from AC power supply is present, the power supply section 58 is switched, for a short period of time, into a state in which electric power is supplied from the secondary battery 60. In this way, the secondary battery 60 is checked for a deterioration in its performance in order to prevent a situation in which the secondary battery 60 cannot perform sterilization in an emergency. In this embodiment, the light source of far-ultraviolet radiation for sterilization is LEDs, which operate with low electric power consumption, and this makes full battery operation possible.

Figure 2:
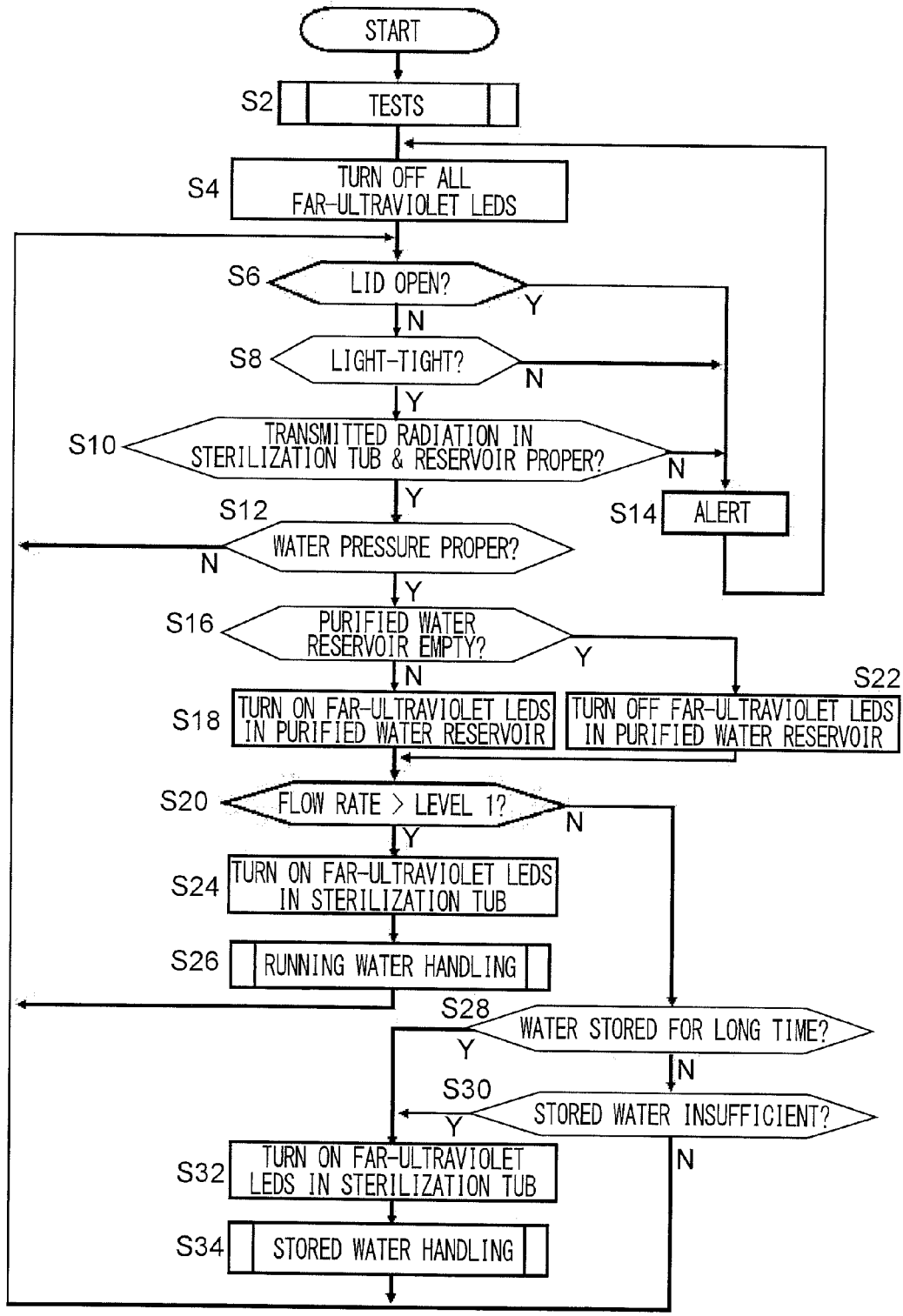
FIG. 2 a flow chart showing the basic functions of the control section in FIG. 1.

FIG. 2 is a flow chart showing the basic functions of the control section 24. The flow starts when, after the water purifier 2 is installed, the power supply section 56 is connected to a receptacle of AC power supply 54, or, in the case of battery operation, the battery is attached. When started, the flow proceeds as follows. At step S2, tests are performed to check whether the water purifier 2 is installed properly. The details will be discussed later.

On completion of the tests at step S2, the flow proceeds to step S4, where, first, all the far-ultraviolet LEDs in the water purifier 2 are turned off. Specifically, the group of far-ultraviolet LEDs 22 in the sterilization tub 20 and the group of far-ultraviolet LEDs 46 in the purified water reservoir 40 are both turned off. Next, at step S6, whether or not the component replacement lid 50 is left in an open state is checked. If the check finds no abnormality, the flow proceeds to step S8, where whether or not the light tightness sensor 52 is detecting leakage of light is checked. If the check finds no abnormality, the flow proceeds to step S10, where it is checked whether or not the transmitted far-ultraviolet radiation as monitored by the water passage transmitted radiation receiving section 30 in the sterilization tub 20 and the transmitted far-ultraviolet radiation as monitored by a light receiving section (not shown) in the purified water reservoir 40 are both proper. If so, the flow proceeds to step S12. Here, the following should be noted. At step S10, if the far-ultraviolet LEDs are not on, no transmitted radiation is detected, in which case the check finds the condition proper. That is, the check at step S10 is one intended for when the far-ultraviolet LEDs are on. This is true with similar steps in the following description.

By contrast, if the check at step S6 finds the component replacement lid 50 in an open state, or if the check at step S8 finds incomplete light tightness, or if the check at step S10 finds any transmitted radiation improper, then in any case the flow proceeds to step S14, where a corresponding abnormality alert is given out. The flow then returns to step S4, where all the far-ultraviolet LEDs are turned off. Thereafter, unless the abnormality is corrected, steps S4 through S10 and S14 are repeated. Here, the following should be noted. If an abnormality is detected at any of steps S6 through S10 when the far-ultraviolet LEDs are already off, step S4 is redundant; even so, however, step S4 is gone through for the purpose of turning all the far-ultraviolet LEDs off on detection of an abnormality in steps S6 through S10, which check for abnormalities in various situations as described later.

At step S12, based on information at the water pressure gauge 10, whether or not the water pressure being applied to the water purifier 2 is proper is checked. A state with a proper water pressure is one in which the main tap 6 is open and the water pressure from the water pipe 4 is applied to the water purifier 2. If the water pressure is not proper, the flow returns to step S6. Thereafter, until the check at step S12 finds the main tap 6 open, steps S6 through S12 are repeated.

If the main tap 6 is open, and thus the water pressure gauge 10 detects a water pressure being applied to the water purifier 2, and thus the check at step S12 finds the water pressure proper, the flow proceeds to S16, where whether or not the purified water reservoir 40 is empty is checked. If it is not empty, the flow proceeds to step S18, where the group of far-ultraviolet LEDs 46 in the purified water reservoir 40 is turned on, and the flow proceeds to step S20. By contrast, if the check at step S16 finds the purified water reservoir 40 empty, the flow proceeds to step S22, where the group of far-ultraviolet LEDs 46 in purified water reservoir 40 is turned off, and the flow proceeds to step S20. In either case, if the group of far-ultraviolet LEDs 46 is already on or off, it is simply left as it is then.

At step S20, based on the output of the flowmeter 12, it is checked whether or not water is flowing into the water purifier 2 at a flow rate equal to or higher than "level 1," and if so, the flow proceeds to step S24. "Level 1" is the minimum-level flow rate at which the switch valve 8 can be regarded as open, and since, as mentioned later, the flow rate when the reservoir valve 38 is fully open is set to be smaller than "level 1," even when the reservoir valve 38 is open, the flow does not proceed from step S20 to step S24. Incidentally, the distinction of whether the flow of water monitored by the flowmeter 12 results from the switch valve 8 or the reservoir valve 38 being open can be made not only by checking the flow rate as at step S20 but also by the control section 24 directly acquiring information on which of the switch valve 8 and the fluorescence observation window 28 is open. When this configuration is adopted, step S20 should instead read "is the switch valve switched to be open for the water purifier and is there a flow of water?"

If the check at step S20 finds a flow rate equal to or higher than level 1, the flow proceeds to step S24, where the group of far-ultraviolet LEDs 22 in the sterilization tub 20 is turned on, and the flow proceeds to running water handling at step S26. The running water handling involves, among others, controlling the amount of energy output from the group of far-ultraviolet LEDs 22 in accordance with the flow rate, and details will be discussed later. On completion of the running water handling at step S26, the flow returns to step S6 to repeat the operations starting at step S6.

By contrast, if the check at step S20 does not find a flow rate equal to or higher than level 1, it is regarded that no water is being served from the switch valve 8, and the flow proceeds to step S28, where whether or not water has been stored in the purified water reservoir 40 for a long time is checked. If the check finds that, for example, the water level in the purified water reservoir 40 has not changed for one day or more, it is regarded that water has been stored for a long time. If the check does not find long-time storage of water, the flow proceeds to step S30, where it is checked whether or not the water level in the purified water reservoir 40 is equal to or lower than a predetermined level and the stored water is insufficient. If the check does not find insufficient storage of water, the flow returns to step S6 to repeat the operations starting at step S6.

If the check at step S28 finds long-time storage of water, or if the check at step S30 finds insufficient storage of water, the flow proceeds to step S32, where the group of far-ultraviolet LEDs 22 in the sterilization tub 20 is turned on, and the flow proceeds to stored water handling at step S34. The stored water handling roughly involves, among others, refreshing or refilling of the stored water, and details will be discussed later. On completion of the running water handling at step S34, the flow returns to step S6 to repeat the operations starting at step S6.

Figure 3:
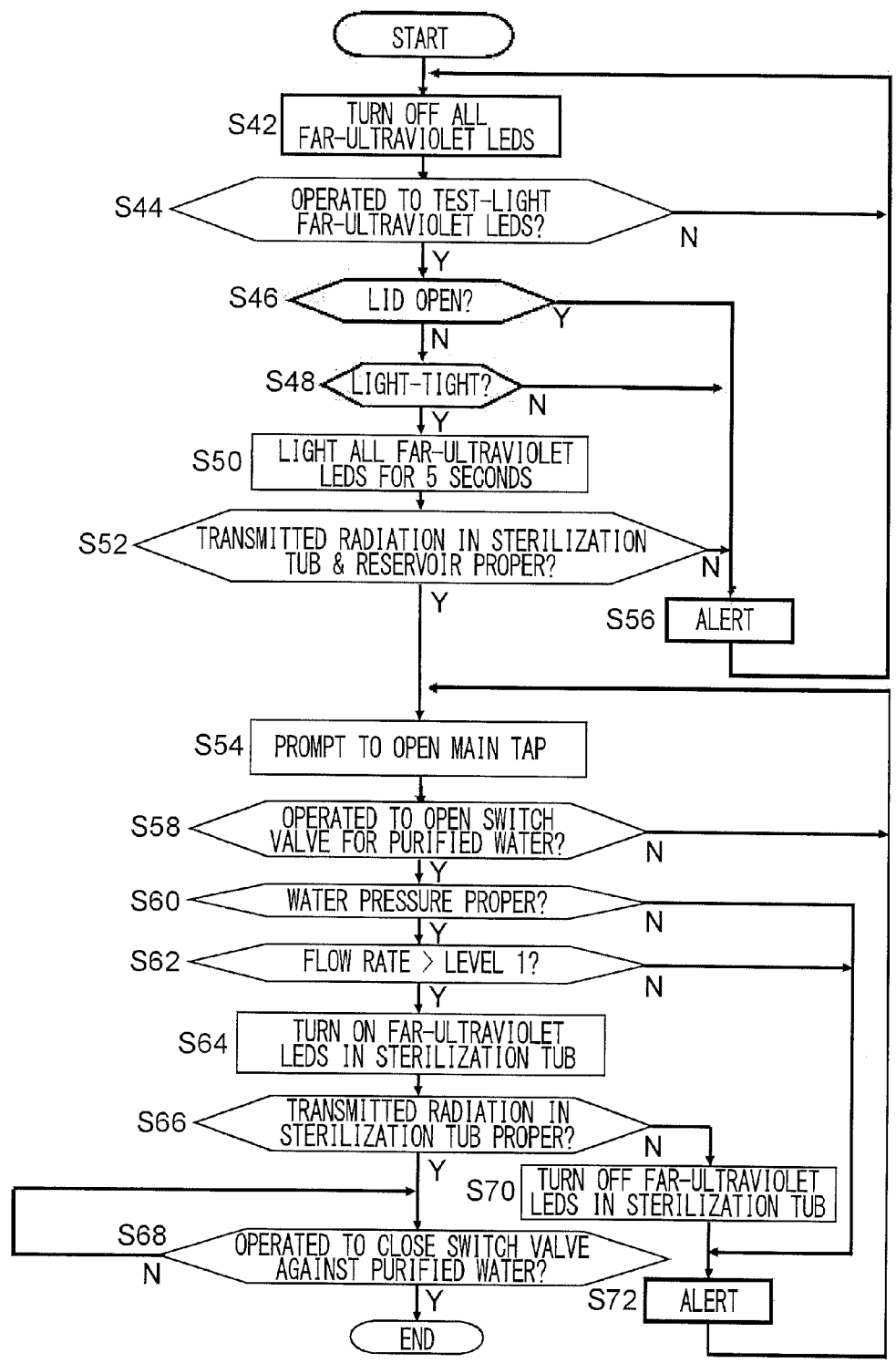
FIG. 3 is a flow chart showing the details of the tests at step S2 in FIG. 2.

FIG. 3 is a flow chart showing the details of the tests at step S2 in FIG. 2. When started, the flow proceeds as follows. First, at step S42, all the far-ultraviolet LEDs are turned off, and the flow proceeds to step S44. Thereafter, while steps S42 and S44 are repeated, a manual operation is waited for to start the test-lighting of the far-ultraviolet LEDs. In this while, it is preferable to make an indication or an announcement prompting a manual operation. When a manual operation is made, the flow proceeds to step S46, where whether or not the component replacement lid 50 is left open is checked. If the check finds no abnormality, the flow proceeds to S48, where whether or not the light tightness sensor 52 is detecting leakage of light is checked. If the check also here finds no abnormality, the flow proceeds to Step S50, where all the far-ultraviolet LEDs are test-lit for five seconds.

The flow then proceeds to step S52, where it is checked whether the transmitted far-ultraviolet radiation as detected by the water passage transmitted radiation receiving section 30 in the sterilization tub 20 and the transmitted far-ultraviolet radiation as detected by a light receiving section (not shown) in the purified water reservoir 40 are both proper. Here, actually, it is still assumed that no water has been introduced into the water purifier 2, and thus "whether proper or not" at step S52 simply concerns whether the LEDs are on or off; thus, the check finds the condition proper so long as they are lit, irrespective of the level. It should be noted that, during the five seconds for which all the far-ultraviolet LEDs are lit, the light emission of the group of far-ultraviolet LEDs 22 and the group of far-ultraviolet LEDs 46 can also be confirmed visually through the fluorescence observation window. If the check at step S52 finds the transmitted radiation proper, the flow proceeds to step S54.

By contrast, if an abnormality is detected at any of steps S46, 48, and 52, the flow proceeds to step S56, where an abnormality alert is given out, and the flow then returns to step S42, where all the far-ultraviolet LEDs 42 are turned off. Thereafter, unless an operation to turn on is made again at step S44, the flow repeats steps S42 and S44. When, in response, the indicated abnormality is corrected and an operation to turn on is made, the checks are made again starting at step S46.

If the transmitted radiation is found proper and the flow proceeds to step S54, a guidance is given out prompting an operation to open the main tap 6, and subsequently, at step S58, an operation is waited for to switch the switch valve 8 to make it open for the water purifier 2. In this while, it is preferable to make an indication or an announcement prompting manually operating the switch valve 8. If, at step S58, an operation to make the switch valve 8 open for purified water is detected, the flow proceeds to step S60, where whether or not the water pressure is proper is checked; if the water pressure is proper, then, at step S62, whether or not the flow rate is equal to or higher than level 1 is checked. Here, if the flow rate is equal to or higher than level 1, that means that the main tap 6 and the switch valve 8 have been opened properly, and thus the flow proceeds to step S64, where the group of far-ultraviolet LEDs 22 in the sterilization tub 20 is turned on. It is here assumed that, at this time, the five seconds' light emission of all the far-ultraviolet LEDs started at step S50 has ended, and thus they are now all off.

Next, at step S66, while the group of far-ultraviolet LEDs 22 is on, it is checked whether or not the transmitted far-ultraviolet radiation as detected by the water passage transmitted radiation receiving section 30 in the sterilization tub 20 is proper. Here, the check is made with water introduced in the sterilization tub 20, and thus "whether proper or not" concerns not simply whether or not the group of far-ultraviolet LEDs 22 is lit but also whether or not the level of the radiation that has been transmitted through the water passage filled with water is proper. If the check at step S66 finds the water passage transmitted radiation proper, the flow proceeds to step S54. Also here, the light emission of the group of far-ultraviolet LEDs 22 can be confirmed visually through the fluorescence observation window 28. The check at step S66 not only serves to check whether or not the transmitted radiation is proper but also serves to check whether or not, when a flow rate equal to or higher than level 1 is detected, the group of far-ultraviolet LEDs 22 is automatically turned on.

If the check at step S66 finds the transmitted radiation proper, the flow proceeds to step S68, where an operation is waited for to close the switch valve 8, which has been open for the water purifier 2. In this while, it is preferable to make an indication or an announcement prompting a manual operation. When a manual operation is made, the flow ends. By contrast, if the check at step S66 finds the transmitted radiation in the sterilization tub 20 improper, the flow proceeds to step S70, where the group of far-ultraviolet LEDs 22 is turned off, then the flow proceeds to step S72, where a corresponding alert is given out, and then the flow returns to step S54. If the check at step S60 finds the water pressure improper, or if the check at step S52 finds the flow rate not equal to or higher than level 1, the flow proceeds to step S72, where a corresponding alert is given out, and then the flow returns to step S54. Thus, it is possible to remove the possible cause for any abnormality and then perform the tests starting at step S54 again.

Figure 4:
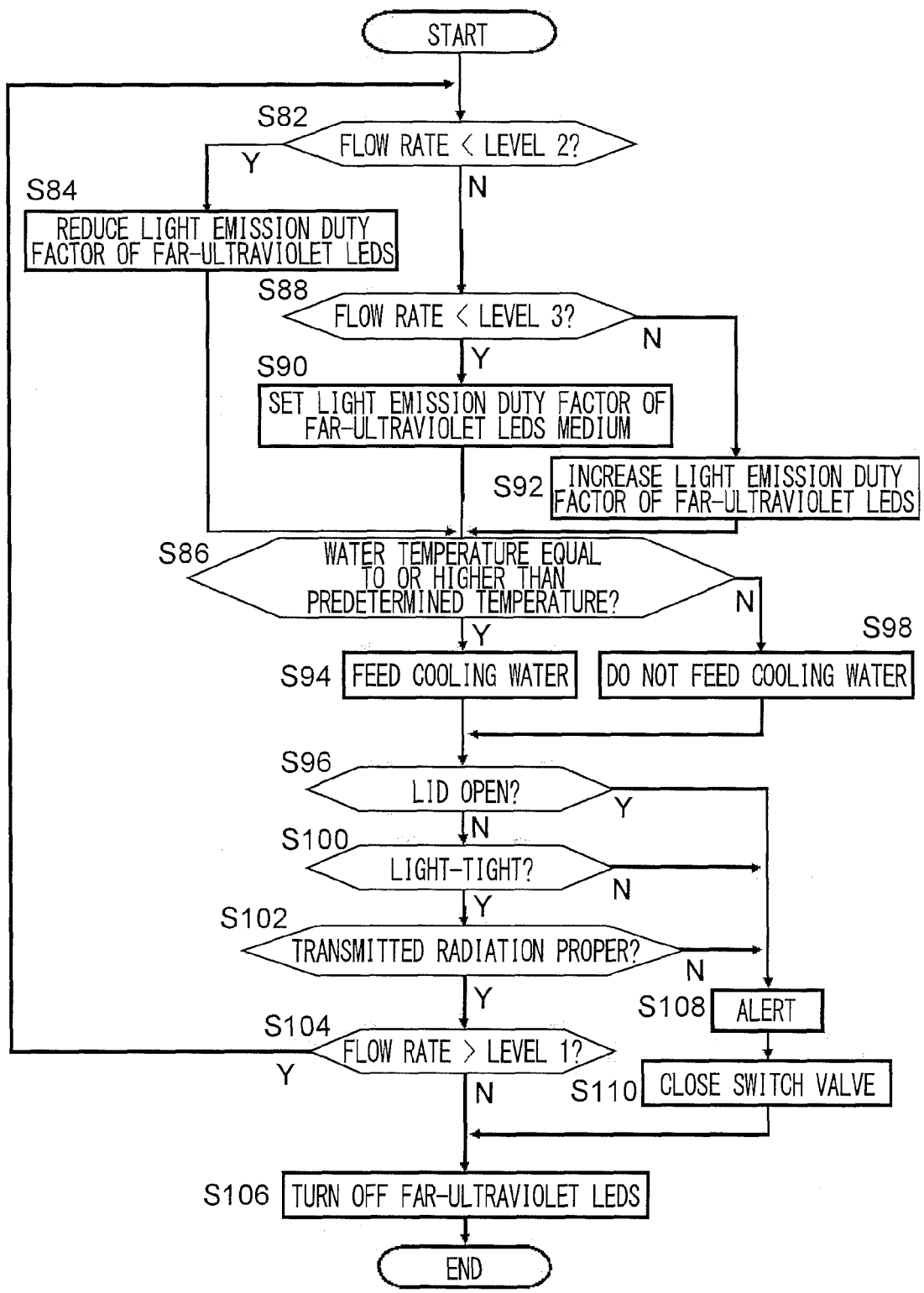
FIG. 4 is a flow chart showing the details of the running water handling at step S26 in FIG. 2.

FIG. 4 is a flow chart showing the details of the running water handling at step S26 in FIG. 2. When started, the flow proceeds as follows. At step S82, whether or not the flow rate is equal to or lower than level 2 (assuming that level 2>level 1) is checked. The flow in FIG. 4 having been started means that the flow rate is higher than level 1, and therefore what is done at step S82 is checking whether or not the flow rate is between levels 1 and 2. If so, the flow proceeds to step S84, where the light emission duty factor of the group of far-ultraviolet LEDs 22 which operates under the PWM control by the drive circuit 26 in FIG. 1 is reduced, and the flow proceeds to step S86. In the running water handling, the group of far-ultraviolet LEDs 22 is mainly controlled, and accordingly, in FIG. 4, for simplicity's sake, the "sterilization tub far-ultraviolet LEDs (the group of far-ultraviolet LEDs 22)" are referred to simply as the "far-ultraviolet LEDs" as at step S84. This applies to the subsequent steps in FIG. 4.

By contrast, if the check at step S82 finds the flow rate higher than level 2, the flow proceeds to step S33, where whether or not the flow rate is equal to or lower than level 3 (assuming that level 3>level 2) is checked. If so, the flow proceeds to step S90, where the light emission duty factor of the group of far-ultraviolet LEDs 22 is set to be medium, and the flow proceeds to step S86. By contrast, if the check at step S88 finds the flow rate higher than level 3, the flow proceeds to step S92, where the light emission duty factor of the group of far-ultraviolet LEDs 22 is increased, and the flow proceeds to step S86. Thus, at steps S82, S84, and S88 through S92, as the flow rate increases, the light emission duty factor of the group of far-ultraviolet LEDs 22 is increased and thereby the radiated energy is increased. Although in FIG. 4, the duty factor is adjusted in three steps, it may be adjusted in more steps, or steplessly, that is, continuously.

At step S86, whether or not the water temperature in the sterilization tub 20 is equal to or higher than a predetermined temperature is checked; if it is equal to or higher than the predetermined temperature, the flow proceeds to step S94, where an instruction is issued to feed water for cooling, and then the flow proceeds to step S96. In response to the instruction at step S94, the cooling water feeding section 34 starts operation involving passing cooling water through the additional water cooling passage, provided in a separate circuit, through the group of far-ultraviolet LEDs 22 and discharging water after heat exchange through the discharge port 36. If the feeding of cooling water has already being started, it is continued. By contrast, if the check at step S86 does not find the water temperature equal to or higher than the predetermined temperature, the flow proceeds to step S98, where an instruction is issued not to feed water, and then the flow proceeds to step S96. In response to the instruction at step S98, the cooling water feeding section 34 stops feeding cooling water. If, at this point, no feeding of cooling water is being done, this state with no water being fed is maintained.

At step S96, whether the component replacement lid 50 is not left open is checked. If the check finds no abnormality, the flow proceeds to step S100, where whether or not the light tightness sensor 52 is detecting leakage of light is checked. If this check too finds no abnormality, the flow proceeds to step S102, where it is checked whether or not the transmitted far-ultraviolet radiation as detected by the water passage transmitted radiation receiving section 30 is proper. If the check finds the transmitted radiation proper, the flow proceeds to step S104.

At step S104, whether or not the flow rate is equal to or higher than level 1 is checked. If the flow rate is equal to or higher than level 1, it is considered that water continues being served with the switch valve 8 open, and thus the flow returns to step S82. Thereafter, unless the flow rate becomes equal to or lower than level 1, steps S82 through S104 are repeated so as to cope with variation in the flow rate, variation in the water temperature, and various abnormalities. By contrast, if the check at step S104 finds the flow rate to have become equal to or lower than level 1, the flow proceeds to step S106, where the group of far-ultraviolet LEDs 22 is turned off, and then the flow ends.

If the check at step S96 finds the component replacement lid 50 in an open state, or if the check at step S100 finds incomplete light tightness, or if the check at step S102 finds the transmitted far-ultraviolet radiation improper, then in any case the flow proceeds to step S108, where an alert of the corresponding abnormality is given out. Next, the flow proceeds to step S110, where, under the control of the control section 24, the switch valve 8 is forcibly closed, and then the flow proceeds to step S106. At step S106, the group of far-ultraviolet LEDs 22 is turned off, and the flow ends.

Figure 5:
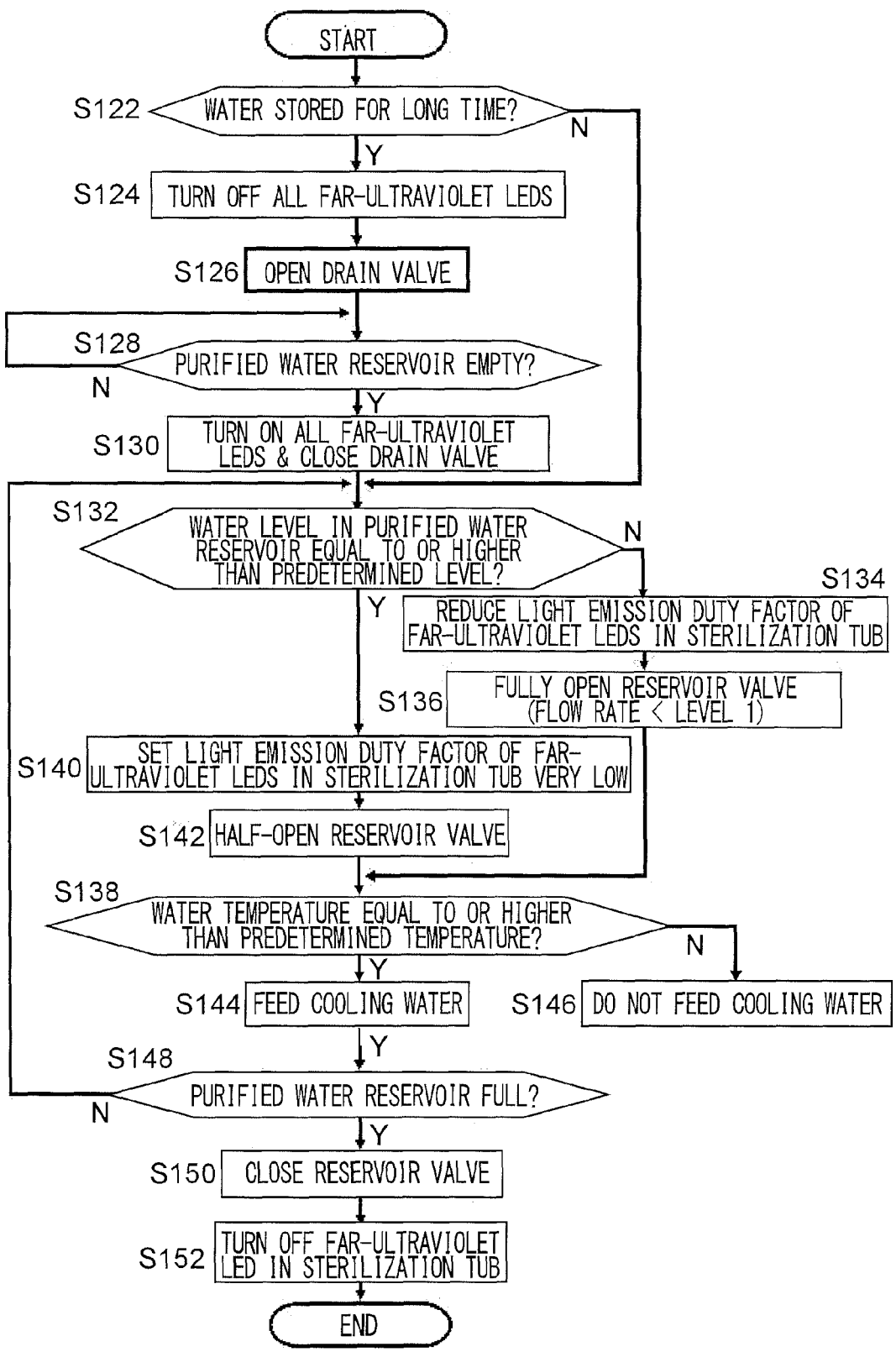
FIG. 5 is a flow chart showing the details of the stored water handling at step S23 in FIG. 2.

FIG. 5 is a flow chart showing the details of the stored water handling at step S34 in FIG. 2. When started, the flow proceeds as follows. At step S122, it is checked whether or not the stored water handling has been started because of long-time storage of water. If the reason is long-time storage of water, the flow proceeds to step S124, where the group of far-ultraviolet LEDs 22 and the group of far-ultraviolet LEDs 46 are turned off. Next, at step S126, the drain valve 44 is opened to start draining the purified water reservoir 40, and then step S128 is repeated until the purified water reservoir 40 becomes empty.

If, at step S128, the purified water reservoir 40 is found to be empty, the flow proceeds to step S130, where the group of far-ultraviolet LEDs 22 and the group of far-ultraviolet LEDs 46 are turned on, and in addition the drain valve 44 is closed. The flow then proceeds to step S132, where whether or not the water level in the purified water reservoir 40 is equal to or higher than a predetermined level is checked. If the flow has proceeded from step S130 to step S132, the water level is naturally equal to or lower than the predetermined level, and therefore the flow proceeds to step S134, where the light emission duty factor of the group of far-ultraviolet LEDs 22 is reduced. Next, at step S136, the reservoir valve 38 is fully opened, and the flow then proceeds to step S138. Here, when the reservoir valve 38 is fully opened, the flow rate at the flowmeter 12 is equal to or lower than level 1. Thus, even when the reservoir valve 38 is opened, the flow does not proceed from step S20 in FIG. 2 to the running water handling.

By contrast, if the check at step S132 finds the water level equal to or higher than the predetermined level, the flow proceeds to step S140, where the light emission duty factor of the group of far-ultraviolet LEDs 22 is set to be very low; then, at step S136, the reservoir valve 38 is half-opened, and then the flow proceeds to step S138. In this way, when the water level in the purified water reservoir 40 is equal to or higher than the predetermined level, the reservoir rate is reduced, and the energy from the group of far-ultraviolet LEDs 22 is minimized.

At step S138, whether or not the water temperature in the sterilization tub 20 is equal to or higher than a predetermined temperature is checked; if it is equal to or higher than the predetermined temperature, the flow proceeds to step S144, where an instruction is issued to feed cooling water, and then the flow proceeds to step S148. The details of the feeding of cooling water are as discussed above. Moreover, as mentioned above, if the feeding of cooling water has already been started, it is continued. By contrast, if the check at step S138 does not find the water temperature equal to or higher than the predetermined temperature, the flow proceeds to step S146, where an instruction is issued not to feed water, and then the flow proceeds to step S148. Also as discussed above, if, at this point, no feeding of cooling water is being done, this state with no water being fed is maintained.

At step S148, whether or not the water level in the purified water reservoir 40 is full is checked. If it is not full, the flow returns to step S132; thereafter, steps S132 through S148 are repeated so that water continues being stored in accordance with the water level and the water temperature. By contrast, if the check at step S148 finds the water level in the purified water reservoir 40 full, the flow proceeds to step S150, where the reservoir valve 38 is closed and then at step S152, the group of far-ultraviolet LEDs 22 is turned off; the flow then ends. It should be noted that the group of far-ultraviolet LEDs 46 in the purified water reservoir 40 is kept on so long as water is stored in the purified water reservoir 40.

Figure 6:
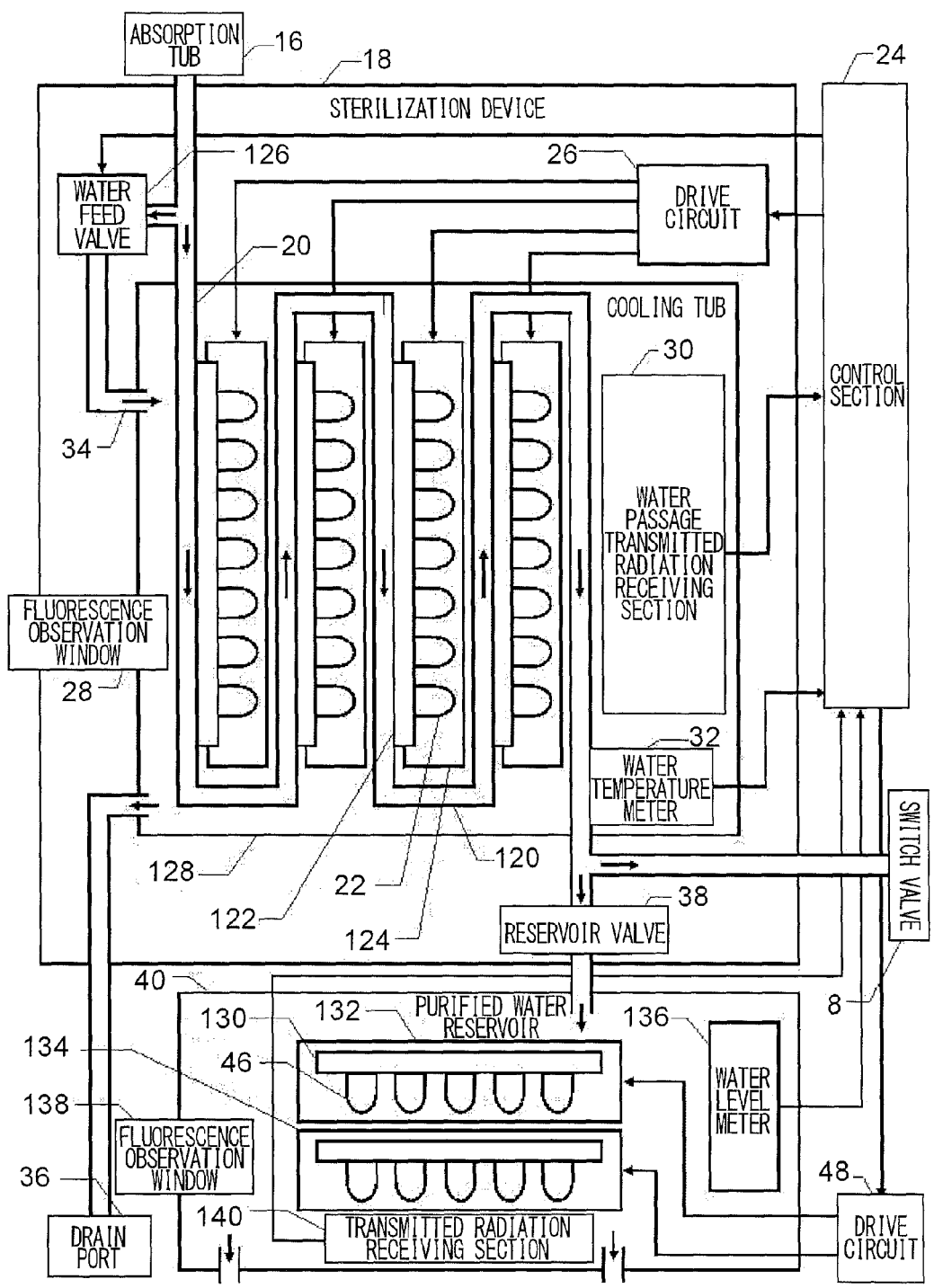
FIG. 6 is a block diagram showing the detailed configuration of the sterilization device and the purified reservoir section in the embodiment in FIG. 1.

FIG. 6 is a block diagram showing the detailed configuration of the sterilization device 18 and the purified water reservoir 40 in the embodiment shown in FIG. 1. Common parts are identified by common reference signs, and no overlapping description will be repeated unless necessary. First, a description will be given of the detailed configuration of the sterilization device 18. The sterilization tub 20 is specifically configured to include a quartz glass water passage 120 that leads from the absorption tub 16, passes through the sterilization device 18, and leads to the switch valve 8 or the reservoir valve 38. The direction of the water flowing through the water passage is indicated by short arrows from place to place. This applies to other configurations described below. As shown in FIG. 6, the group of far-ultraviolet LEDs 22 is disposed between folded parts of the quartz glass water passage 120, and are so arranged that the water flowing through the quartz glass water passage 120 passes by the individual far-ultraviolet LEDs one after another and that the water simultaneously cools down the far-ultraviolet LEDs.

The group of far-ultraviolet LEDs 22 is arranged in an array on a metal heat-dissipating substrate 122, and is, from outside, covered by a quartz glass package 124. Here, the rear face of the heat-dissipating substrate 122 is exposed outside the quartz glass package 124. This allows the quartz glass water passage 120 to remain in close contact with the rear face of the heat-dissipating substrate 122, and thus enhances the effect of cooling down the rear side of the heat-dissipating substrate 122 by the water flowing through the quartz glass water passage 120. The water passage transmitted radiation receiving section 30 receives ultraviolet radiation emitted from the group of far-ultraviolet LEDs 22 and transmitted through the quartz glass water passage 120. This makes it possible to confirm the emission of ultraviolet radiation from the group of far-ultraviolet LEDs 22, and to detect dirt or the like inside the quartz glass water passage 120 by detecting a lowering in the intensity of the transmitted radiation. The water temperature meter 32 is provided near the exit of the quartz glass water passage 120, where the heat applied to the water accumulates.

The cooling water feeding section 34 has a water feed valve 126 and a cooling tub 128 which are controlled by the control section 24. The cooling tub 128 serves to immerse, directly in the water that has entered it from the water feed valve 126, and thereby cool the quartz glass package 124 of the group of far-ultraviolet LEDs 22 and the rear face of the heat-dissipating substrate 122. The water that has been used for cooling is discharged through the drain port 36. Thus, the water in the cooling water feeding section 34, by making direct contact with the rear face of the heat-dissipating substrate 122, exerts a more powerful cooling effect, and does not mix with the purified water passing through the quartz glass water passage 120.

Like the group of far-ultraviolet LEDs 22 in the sterilization device 18, the group of far-ultraviolet LEDs 46 in the purified water reservoir 40 is arranged in an array on a metal heat-dissipation substrate 130, and a quartz glass package 132 here covers the group of far-ultraviolet LEDs 46 including the rear face of the heat-dissipation substrate 130. Similarly configured is a group of far-ultraviolet LEDs covered by a lower quartz glass package 134. Thus, in the purified water reservoir 40, units, that is, groups, of far-ultraviolet LEDs, each unit having a structure entirely covered in a quartz glass package, are immersed directly in purified water, with those units stacked in horizontal layers. The purpose of covering the back face of the heat-dissipation substrate 130 with the quartz glass package 132 as described above is to prevent the stored purified water making direct contact with the heat-dissipation substrate 130 and thereby being contaminated; at the back face of the heat-dissipation substrate 130, the quartz glass package 132 is extremely thin, and through this thin layer of the quartz glass package 132, heat dissipates efficiently from the back face of the heat-dissipation substrate 130 to the stored water.

A water level meter 136 monitors the water level of the stored purified water and conveys it to the control section 24. Based on the conveyed water level, the control section 24 instructs a drive circuit 48 to control the group of far-ultraviolet LEDs 46. Specifically, when the water level is so low that only the group of far-ultraviolet LEDs covered by the lower quartz glass package 132 is submerged in purified water, then only lower unit, that is, group, of far-ultraviolet LEDs is turned on; when the water level is so high that also the upper unit, that is, group, of far-ultraviolet LEDs covered by the quartz glass package 132 is submerged in purified water, then both units, that is, groups, of the far-ultraviolet LEDs are turned on. This makes it possible to prevent, for example, the upper group of far-ultraviolet LEDs, which appears above the water surface when the water level is low, from being kept driven meaninglessly in an uncoolable condition. Although FIG. 6 shows units, that is, groups, of far-ultraviolet LEDs in two horizontal layers for simplicity's sake, a number of such layers may be provided and are turned on and off more finely according to the water level.

Through a fluorescence observation window 138, which is omitted in FIG. 1, the light emission of the group of far-ultraviolet LEDs 46 in the purified water reservoir 40 can be checked visually. A transmitted radiation receiving section 140, which too is omitted in FIG. 1, serves to receive and convey to the control section 24 the ultraviolet radiation emitted from the group of far-ultraviolet LEDs 46 configured as described above and transmitted through the purified water stored in the purified water reservoir 40.

As described above, according to the present invention, to make a water purifier employing far-ultraviolet LEDs suitable for general use as for use in households, in such a water purifier, various safety measures are adopted to prevent unforeseeable accidents resulting from exposure to ultraviolet radiation. In addition, in the embodiment of the invention, with consideration given also to accidents that may occur if the water purifier 2 is disassembled and the group of far-ultraviolet LEDs 22 or 46 is taken out and misused (used for unintended uses), the group of far-ultraviolet LEDs 22 and 46 are so configured that, when separated from the water purifier 2, they alone do not generate ultraviolet radiation. Specifically, the following configuration is adopted: a misuse prevention contact is provided among the contacts on the quartz glass package covering the far-ultraviolet LEDs, and a misuse prevention check circuit is provided within the quartz glass package; unless the misuse prevention check circuit recognizes an encryption key signal being fed from the water purifier 2 to the misuse prevention contact, the group of far-ultraviolet LEDs 22 and 46 do not emit ultraviolet radiation. Moreover, misuse prevention internal leads are provided in individual far-ultraviolet LEDs for connection to the heat-dissipating substrate 122 or 130 so that, when individual far-ultraviolet LEDs 22 or 46 are removed carelessly from the heat-dissipating substrate 122 or heat-dissipation substrate 130, they are mechanically affected in such a way that the misuse prevention internal leads are broken and make the individual far-ultraviolet LEDs 22 or 46 unusable thereafter.

To follow is a summary of the various technical features disclosed in the present description.

The technology disclosed in the present description provides a water purifier that includes: a source water inlet through which source water is fed in from outside the enclosure; a purification section; an ultraviolet radiation sterilization section which has an ultraviolet light source; a purified water outlet through which purified water purified by the purification section and sterilized by the ultraviolet radiation sterilization section is fed out to outside the enclosure; a detection section which detects a condition in which ultraviolet radiation can leak from inside to outside the enclosure; and a control section which, when the detection section detects a condition in which ultraviolet radiation can leak, inhibits the ultraviolet light source from generating ultraviolet radiation. This makes it possible to provide a water purifier provided with an ultraviolet radiation sterilizing ability for general use as for use in households in a form free from a risk of exposure to ultraviolet radiation. According to a specific feature of the technology disclosed in the present description, as the light source in the ultraviolet radiation sterilization section, a far-ultraviolet LED is adopted. Far-ultraviolet radiation has a powerful sterilizing ability and is accordingly hazardous; thus its handling requires caution. However, with the above feature of the technology disclosed in the present description, far-ultraviolet radiation can be used suitably in water purifiers for general use as for use in households According to a specific feature of the technology disclosed in the present description, a lid for maintenance inside the water purifier is provided in the enclosure, and the detection section detects whether or not the lid is in an improperly closed state. This makes it possible to prevent exposure to ultraviolet radiation when the lid is opened for maintenance or when it is closed incompletely. According to another specific feature of the technology disclosed in the present description, the detection section detects leakage of light from outside to inside the enclosure. This makes it possible to detect, conversely, a condition in which ultraviolet radiation is leaking from inside to outside the enclosure, and thus it is possible to prevent exposure to ultraviolet radiation resulting from unexpected breakage or failure of the water purifier.

According to another specific feature of the technology disclosed in the present description, while the water purifier is in use, the control section inhibits the ultraviolet light source from generating ultraviolet radiation. This makes it possible to prevent exposure to ultraviolet radiation when a condition in which ultraviolet radiation can leak arises in different modes of use of the water purifier as during ordinary use of the water purifier or during regular maintenance of the water purifier. According to another specific feature of the technology disclosed in the present description, the control section inhibits the ultraviolet light source from generating ultraviolet radiation when generation of ultraviolet radiation is attempted to test the water purifier. This makes it possible to prevent ultraviolet radiation exposure accidents when generation of ultraviolet radiation is attempted in a condition in which ultraviolet radiation can leak as when the water purifier is installed or when it is subjected to regular checks. There may be provided an alerting section that gives out an alert when the detection section detects a condition in which ultraviolet radiation can leak due to various causes in various situations; this suitably makes it possible to recognize the cause for the prohibition of ultraviolet radiation generation.

According to another feature of the technology disclosed in the present description, a water purifier is provided that includes: a source water inlet through which source water is fed in from outside an enclosure; a purification section; an ultraviolet radiation sterilization section which has a quartz glass water passage and a far-ultraviolet LED for letting far-ultraviolet radiation be transmitted through the quartz glass water passage; and a purified water outlet through which purified water purified by the purification section and sterilized by the ultraviolet radiation sterilization section is fed out to outside the enclosure. With this feature, owing to the use of an LED as the ultraviolet light source, it is possible to configure an ultraviolet radiation sterilization section that offers a powerful sterilizing effect, that is compact, and that operates with low electric power consumption, and thus it is possible to provide a water purifier having a sterilizing ability for general use as for use in households.

According to another specific feature of the technology disclosed in the present description, there is provided a detection section which detects a flaw in transmission of far-ultraviolet radiation through the quartz glass water passage. This makes it possible to recognize how far-ultraviolet radiation is being transmitted at a place where sterilization is actually taking place, and to be prepared for a lowering in the sterilizing effect due to such a flaw. According to a more detailed feature, there is provided a control section which, when the detection section detects a flaw in transmission of far-ultraviolet radiation, inhibits the ultraviolet light source from generating ultraviolet radiation. This makes it possible to prevent generation of far-ultraviolet radiation from being continued despite a lowering in the sterilizing effect. According to another more detailed feature, there is provided an alerting section which, when the detection section detects a flaw in transmission of far-ultraviolet radiation, gives out an alert calling attention to it. This makes it possible to recognize the cause for the flaw.

According to another feature of the technology disclosed in the present description, a water purifier is provided that includes: a source water inlet through which source water is fed in from outside an enclosure; a purification section; an ultraviolet radiation sterilization section which has an ultraviolet light source; a purified water outlet through which purified water purified by the purification section and sterilized by the ultraviolet radiation sterilization section is fed out to outside the enclosure; and a control section which controls generation of ultraviolet radiation by the ultraviolet light source according to the detection by a detection section which detects a purified water outflow state in which purified water is flowing out through the purified water outlet. This makes it possible to control generation of ultraviolet radiation in a way that suits how purified water is flowing out through the purified water outlet. For example, it is possible to adopt a configuration in which, when the detection section detects the purified water outflow state, the ultraviolet light source is permitted to generate ultraviolet radiation and, when the detection section does not detect the purified water outflow state, the ultraviolet light source is inhibited from generating ultraviolet radiation. A preferred example of the purification section is a filtering section combined with an absorbing section.

According to another feature of the technology disclosed in the present description, a water purifier is provided that includes: a source water inlet through which source water is fed in from outside an enclosure; a purification section; a reservoir section in which purified water purified by the purification section is stored; a purified water outlet through which the purified water stored in the reservoir section is fed out to outside the enclosure; and an ultraviolet radiation sterilization section which sterilizes the purified water before the purified water flows out through the purified water outlet. Providing the reservoir section in this way makes it possible to secure purified water through sterilization performed little by little for a sufficient length of time.

According to a specific feature of the technology disclosed in the present description, the far-ultraviolet LED is provided inside the reservoir section. This makes it possible to secure a sufficient length of sterilization time for a given part of the purified water. According to another specific feature of the technology disclosed in the present description, the far-ultraviolet LED is controlled according to the amount of water stored in the reservoir section. This makes it possible to control the far-ultraviolet LED rationally. According to yet another specific feature of the technology disclosed in the present description, there is provided a control section which, when the purified water in the reservoir section has been stored there for more than a predetermined length of time, discharges the purified water. This makes it possible to prevent inconveniences resulting from long-time storage of time. More specifically, when the purified water in the reservoir section is discharged, the far-ultraviolet LED is inhibited from generating ultraviolet radiation to prevent unnecessary generation of ultraviolet radiation. According to another feature of the technology disclosed in the present description, the reservoir section is configured to store purified water that has passed through the ultraviolet radiation sterilization section. In any case, it is preferable that the far-ultraviolet LED generate far-ultraviolet radiation when water is stored in the reservoir section.

According to another feature of the technology disclosed in the present description, a purified water is provided that includes: a source water inlet through which source water is fed in from outside the enclosure; a purification section; an ultraviolet radiation sterilization section which has a far-ultraviolet LED as a light source; a purified water outlet through which purified water purified by the purification section and sterilized by the ultraviolet radiation sterilization section is fed out to outside the enclosure; a control section which controls generation of ultraviolet radiation from the far-ultraviolet LED; and a fluorescence guide section which makes the ultraviolet radiation generated by the far-ultraviolet LED visible from outside the enclosure in a form of visible fluorescence having ultraviolet radiation eliminated therefrom. This makes it possible to visually confirm generation of ultraviolet radiation by the far-ultraviolet LED controlled by the control section, and serves as an appealing feature of the product that indicates that the water purifier has an ultraviolet radiation sterilizing ability.

The technology disclosed in the present description provides a water purifier that includes: a water inlet; an ultraviolet radiation sterilization section which sterilizes water flowing in through the water inlet with a far-ultraviolet LED as a light source; a water outlet through which purified water sterilized by the ultraviolet radiation sterilization section is fed out, and a cooling section which cools down the far-ultraviolet LED with water flowing in through the water inlet. As an LED generates heat, its light emission efficiency lowers. However, with the above feature of the technology disclosed in the present description, the far-ultraviolet LED can be cooled down with the water that flows in for purification. Thus, it is possible to produce purified water effectively without a lowering in the sterilizing effect.

According to a specific feature of the technology disclosed in the present description, the cooling section cools down the far-ultraviolet LED with the very water flowing in through the water inlet and flowing out through the water outlet. This makes it possible to realize a configuration that integrates together the sterilization of water by the far-ultraviolet LED and the cooling of the far-ultraviolet LED with that water. According to a more specific feature of the technology disclosed in the present description, the cooling section has a water passage through which the water exposed to the ultraviolet radiation generated by the far-ultraviolet LED is passed to cool down the far-ultraviolet LED. According to a further specific feature of the technology disclosed in the present description, the far-ultraviolet LED has an ultraviolet light emitting portion and a heat dissipating portion, and the water passage is arranged to run across the ultraviolet light emitting portion and the heat dissipating portion.

According to another specific feature of the technology disclosed in the present description, the cooling section has a cooling water passage through which cooling water is passed which flows in through the water inlet but does not mix with the purified water flowing out through the water outlet. With this feature, the necessary amount of water for cooling can be secured independently of the amount of sterilized purified water, and since the thus secured cooling water does not mix with the purified water, its insufficient sterilization does not matter.

According to a more specific feature of the technology disclosed in the present description, the cooling section cools down the far-ultraviolet LED with the very water flowing in through the water inlet and flowing out through the water outlet, and in addition has a water feeding section which, when the cooling is insufficient, introduces water from the water inlet into the cooling water passage. This makes it possible to perform cooling effectively first with the sterilized water itself and, when the cooling is insufficient, to additionally use the cooling ability of the cooling water passage. According to a further specific feature of the technology disclosed in the present description, whether or not water from the water inlet is introduced into the cooling water passage is determined according to the water temperature in the water outlet.

According to another feature of the technology disclosed in the present description, a water purifier is provided that includes: a reservoir section; an ultraviolet radiation sterilization section which sterilizes water stored in the reservoir section with a far-ultraviolet LED as a light source and which has a heat dissipation structure in which the far-ultraviolet LED is cooled down with the very water stored in the reservoir section. This makes it possible to realize a configuration that integrates together the sterilization of water by the far-ultraviolet LED structure immersed in water in the reservoir section and the cooling of the far-ultraviolet LED structure achieved by its immersion in water in the reservoir section.

According to a more specific feature of the technology disclosed in the present description, as the heat dissipation structure, a metal heat dissipating plate connected to the far-ultraviolet LED is adopted. According to a further specific feature of the technology disclosed in the present description, the metal heat dissipating plate is coated so as not to make direct contact with the water stored in the reservoir section. This makes it possible to prevent purified water from being contaminated as a result of the sterilization structure being immersed in water in the reservoir section. According to another specific feature related to the technology disclosed in the present description, the far-ultraviolet LED is controlled according to the water level of the water stored in the reservoir section. This makes it possible, for example, to prevent a part of the sterilization structure that appears above the water surface when the water level is low from being kept driven meaninglessly in an uncoolable condition.

According to another feature of the technology disclosed in the present description, a water purifier is provided that includes: an ultraviolet radiation sterilization section which sterilizes water with a far-ultraviolet LED as a light source; a cooling section which cools down the far-ultraviolet LED with water; and a drive section which drives the far-ultraviolet LED such that an ultraviolet radiation generation period and an ultraviolet radiation non-generation/cooling period alternate. This makes it possible to integrate together, in a water purifier that treats water, the provision of an ultraviolet radiation non-generation/cooling period of the far-ultraviolet LED and the cooling of the far-ultraviolet LED with water, and thus it is possible to effectively realize a water purifier that offers an sterilizing effect. According to a specific feature of the technology disclosed in the present description, there are further provided a water inlet and a water outlet through which purified water sterilized by the ultraviolet radiation sterilization section is fed out, and the cooling section cools down the far-ultraviolet LED with the very water flowing in through the water inlet and flowing out through the water outlet. This makes it possible to realize a specific configuration that makes the most of the features mentioned above. According to a more specific feature of the technology disclosed in the present description, the drive section for the far-ultraviolet LED varies the ultraviolet radiation energy generated by the far-ultraviolet LED, and uses the ultraviolet radiation generation period and the ultraviolet radiation non-generation/cooling period by varying their ratio.

According to another feature of the technology disclosed in the present description, a water purifier is provided that includes: a water inlet; an ultraviolet radiation sterilization section which sterilizes water flowing in through the water inlet with a far-ultraviolet LED as a light source; a water outlet through which purified water sterilized by the ultraviolet radiation sterilization section is fed out; and a control section which controls the ultraviolet radiation energy generated by the far-ultraviolet LED according to the flow rate at which water flows out through the water outlet. This makes it possible to perform sterilization according to the amount of purified water needed.

According to another feature of the technology disclosed in the present description, an ultraviolet radiation sterilization section which sterilizes water with a far-ultraviolet LED as a light source; a power supply section which is supplied with electric power from outside to drive the far-ultraviolet LED and which has a secondary battery charged with the supplied electric power; and a control section which normally supplies the far-ultraviolet LED with the electric power supplied from the outside and which, under a predetermined condition, even when electric power is being supplied from outside, supplies the far-ultraviolet LED with electric power from the secondary battery. This makes it possible to check the functioning of the secondary battery every time the predetermined condition is fulfilled, and thereby to prevent a situation in which the secondary battery does not function when the far-ultraviolet LED really needs to be supplied with electric power from the secondary battery in an emergency such as a power outage. According to a specific feature of the technology disclosed in the present description, there is further provided a water outlet through which water sterilized by the ultraviolet radiation sterilization section is fed out, and the control section supplies the far-ultraviolet LED with electric power from the secondary battery according to how water is flowing out through the water outlet. This is one rational example of the predetermined condition mentioned above.

INDUSTRIAL APPLICABILITY

According to the present invention, it is possible to realize a water purifier that is provided with a sterilizing ability but is nevertheless fit for general use as for use in households.

LIST OF REFERENCE SIGNS 2 enclosure
7 source water inlet
14, 16 purification section
22 ultraviolet light source
20 ultraviolet radiation sterilization section
37 purified water outlet
50, 52 detection section
24 control section
22 far-ultraviolet LED
50 lid
52 light tightness sensor
54 alerting section
30 water passage transmitted radiation receiving section
12 purified water outflow state detection section
14 filtering section
16 absorption section
42 purified water outlet from reservoir section
22, 46 ultraviolet radiation sterilization section
46 ultraviolet radiation sterilization section in reservoir section
44 purified water discharge section
28 fluorescence guide section
7 water inlet
22 far-ultraviolet LED
20 ultraviolet radiation sterilization section
37 water outlet
120 cooling section
120 water passage
22 ultraviolet light emitting portion
122 heat dissipating portion
128 cooling water passage
126 feeding section
24 control section
40 reservoir section
46 far-ultraviolet LED
130 heat dissipation structure
132, 134 coat
26, 48 drive section
60 secondary battery
58 power supply section

What is claimed is:

1. A water purifier comprising:
an enclosure;
a source water inlet through which source water is fed in from outside the enclosure;
a purification section;
an ultraviolet radiation sterilization section which has an ultraviolet light source;
a purified water outlet through which purified water purified by the purification section and sterilized by the ultraviolet radiation sterilization section is fed out to outside the enclosure;
a condition detection section; and
a control section which controls generation of ultraviolet radiation from the ultraviolet light source according to detection by the condition detection section; wherein the condition detection section has an abnormality detection section which detects a condition in which ultraviolet radiation can leak from inside to outside the enclosure, and when the abnormality detection section detects the condition in which ultraviolet radiation can leak, the control section inhibits the ultraviolet light source from generating ultraviolet radiation.

2. The water purifier according to claim 1, wherein
the enclosure has a lid for maintenance inside the water purifier, and
the abnormality detection section detects whether or not the lid is in an improperly closed state.

3. The water purifier according to claim 1, wherein
the abnormality detection section has a light leakage detection section which detects leakage of light from outside to inside the enclosure.

4. The water purifier according to claim 1, wherein
the ultraviolet radiation sterilization section has a far-ultraviolet LED for letting ultraviolet radiation be transmitted through a quartz glass water passage.

5. The water purifier according to claim 4, further comprising:
a water passage transmitted radiation detection section which detects a flaw in transmission of far-ultraviolet radiation through the quartz glass water passage.

6. The water purifier according to claim 1, wherein
the condition detection section has a running water detection section which detects a purified water outflow state in which purified water is flowing out through the purified water outlet, and wherein
when the running water detection section detects the purified water outflow state, the control section makes the ultraviolet light source generate ultraviolet radiation, and when the running water detection section does not detect the purified water outflow state, the control section inhibits the ultraviolet light source from generating ultraviolet radiation.

7. The water purifier according to claim 1, further comprising:
a reservoir section in which purified water purified by the purification section is stored, wherein
the purified water outlet is configured to feed out the purified water stored in the reservoir section flow to outside the enclosure, and the ultraviolet radiation sterilization section has a far-ultraviolet LED and sterilizes the purified water before the purified water flows out through the purified water outlet.

8. The water purifier according to claim 7, wherein the far-ultraviolet LED is provided inside the reservoir section.

9. The water purifier according to claim 7, wherein the condition detection section has a stored water amount detection section which detects the amount of water stored in the reservoir section, and the control section controls the far-ultraviolet LED according to detection by the stored water amount detection section.

10. The water purifier according to claim 7, wherein the control section inhibits the far-ultraviolet LED from generating ultraviolet radiation when the purified water in the reservoir section is discharged.

11. The water purifier according to claim 1, further comprising:
a fluorescence derivation section which makes the ultraviolet radiation generated by the ultraviolet light source visible from outside the enclosure in a form of visible fluorescence having ultraviolet radiation eliminated therefrom.

12. The water purifier according to claim 1, wherein the ultraviolet light source has a far-ultraviolet LED, and has a cooling section which cools down the far-ultraviolet LED with water inside the water purifier.

13. A water purifier comprising:
a water inlet;
an ultraviolet radiation sterilization section which sterilizes water flowing in through the water inlet with a far-ultraviolet LED as a light source;
a water outlet through which purified water sterilized by the ultraviolet radiation sterilization section is fed out,
a cooling section which cools down the far-ultraviolet LED with water flowing in through the water inlet; a condition detection section; and
a control section which controls generation of ultraviolet radiation from the far-ultraviolet LED according to detection by the condition detection section, wherein the condition detection section has an abnormality detection section which detects a condition in which ultraviolet radiation can leak from inside to outside the enclosure, and when the abnormality detection section detects the condition in which ultraviolet radiation can leak, the control section inhibits the far-ultraviolet LED from generating ultraviolet radiation.

14. The water purifier according to claim 13, wherein the cooling section cools down the far-ultraviolet LED with the very water flowing in through the water inlet and flowing out through the water outlet.

15. The water purifier according to claim 13, wherein the cooling section has a water passage through which the water exposed to the ultraviolet radiation generated by the far-ultraviolet LED is passed to cool down the far-ultraviolet LED, wherein the far-ultraviolet LED has an ultraviolet light emitting portion and a heat dissipating portion, and wherein the water passage is arranged to run across the ultraviolet light emitting portion and the heat dissipating portion.

16. The water purifier according to claim 13, further comprising:
a drive section which drives the far-ultraviolet LED such that an ultraviolet radiation generation period and an ultraviolet radiation non-generation/cooling period alternate.

17. The water purifier according to claim 13, further comprising:
a power supply section which is supplied with electric power from outside to drive the far-ultraviolet LED and which has a secondary battery charged with the supplied electric power; and
a control section which normally supplies the far-ultraviolet LED with the electric power supplied from the outside and which, under a predetermined condition, even when electric power is being supplied from outside, supplies the far-ultraviolet LED with electric power from the secondary battery.

18. A water purifier comprising:
an ultraviolet radiation sterilization section which sterilizes water with a far-ultraviolet LED as a light source;
a power supply section which is supplied with electric power from outside to drive the far-ultraviolet LED and which has a secondary battery charged with the supplied electric power;
a control section which normally supplies the far-ultraviolet LED with the electric power supplied from the outside and which, under a predetermined condition, even when electric power is being supplied from outside, supplies the far-ultraviolet LED with electric power from the secondary battery; a radiation condition detection section; and
a control section which controls generation of ultraviolet radiation from the far-ultraviolet LED according to detection by the condition detection section, wherein the condition detection section has an abnormality detection section which detects a condition in which ultraviolet radiation can leak from inside to outside the enclosure, and when the abnormality detection section detects the condition in which ultraviolet radiation can leak, the radiation control section inhibits the far-ultraviolet LED from generating ultraviolet radiation.

19. The water purifier according to claim 18, further comprising:
a water outlet through which water sterilized by the ultraviolet radiation sterilization section is fed out, wherein
the control section supplies the far-ultraviolet LED with electric power from the secondary battery according to how water is flowing out through the water outlet.

* * * * *